Patented May 12, 1925.

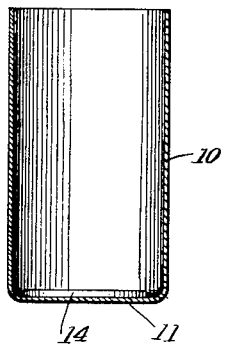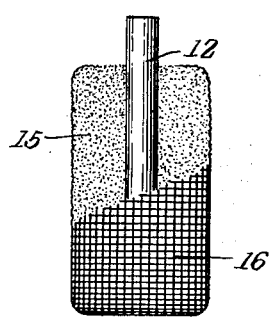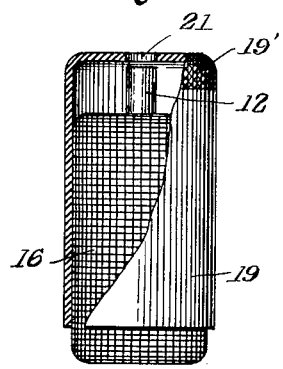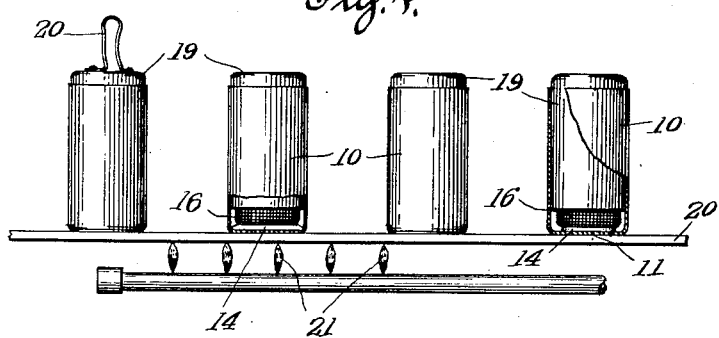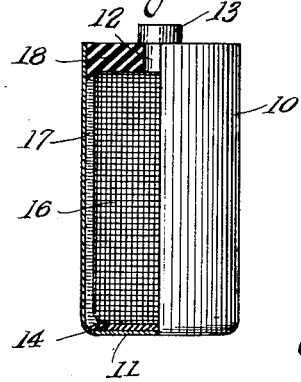

1,537,340

UNITED STATES PATENT OFFICE.

RICHARD MAX EATON, OF NIAGARA FALLS, NEW YORK, ASSIGNOR TO NIAGARA SEARCHLIGHT COMPANY, INC., OF NIAGARA FALLS, NEW YORK, A CORPORATION OF NEW YORK.

PROCESS FOR ASSEMBLING BATTERY CELLS.

Application filed April 15, 1924. Serial No. 706,723.

*To all whom it may concern:*

Be it known that I, RICHARD MAX EATON, a citizen of the United States, and a resident of Niagara Falls, in the county of Niagara and State of New York, have invented certain new and useful Improvements in Processes for Assembling Battery Cells, of which the following is a specification.

This invention relates to improvements in dry cell batteries and particularly to types comprised of a zinc casing containing a carbon core and an intermediate electropion or excitant.

In order to obtain the best results from such battery cells, uniformity in amperage, voltage, weight and appearance, as well as in their rapid and economical manufacture, it is desirable that the several parts be made in duplicate and that the same be capable of correct assembly with a minimum of hand labor.

One of the difficulties encountered in assembling is to maintain the carbon concentric with the casing while the pasty electropion is being entered and until it has, in a manner become set or partially solidified and to provide means for accomplishing this purpose is one of the principal objects of the invention.

Another aim is in the provision of means for softening the paraffin used in the bottom of the cell, so that it may quickly and readily spread, forming an impervious and non-conducting coat, protective of the cell and on which the carbon particles and solid core may preferably rest.

These and other similar aims and objects are attained by the novel construction and combination of parts employed and processes used, as hereafter described and illustrated in the annexed drawing, forming part hereof and in which:—

Figure 1 is a sectional view taken through a conventional type of battery cell casing or shell.

Figure 2 is a partial side, partial sectional view of the pulverized and stick carbon, as enclosed in a netted textile covering prior to insertion in the shell.

Figure 3 is a partial side elevational, partial vertical sectional view of an embodiment of the invention, indicating its application.

Figure 4 is a side elevational view, largely diagrammatic, and partially broken away showing the manner of finishing the cells.

Figure 5 is a partial side elevational and partial longitudinal sectional view of a finished battery cell.

In the drawing, the numeral 10 designates the shell or casing of an ordinary cylindrical type of battery cell, usually made of zinc and formed with an integral bottom 11.

Disposed centrally in the shell is a carbon element 12, its upper extending end being provided with a metal cap 13 and its lower end raised and separated from the bottom 11 by a non-conductor, preferably a paraffin coating 14 of considerable thickness, which may extend completely over the inner surface of the cell bottom or be applied in the form of a disc to the bottom of the carbon mass, forming a seat for the same as shown in Figure 5.

Surrounding the carbon stick or rod 12 is a pasty mass 15 composed of finely granulated or pulverized particles of carbon and in order to maintain this mass in a relatively compact and coherent manner, it is enclosed in a netted or coarsely woven container or sack, such as cheese cloth, the outer diameter of which is considerably less than that of the interior of the shell 10.

The remaining space is then filled with an electropion or excitant 17, such as salammoniac, and a cap 18 applied over the top of the carbon body, sealing the space between the stick 12 and cell 10, this cap 18 being of wax, resin or like cementitious material.

It will be apparent that the best possible results attainable from such cells can only be secured if the carbon content and zinc shell be concentric so that the space therebetween is uniform and an equal distribution of the excitant be accomplished.

This result is attained by the use of a cylindrical adjuster 19 inserted in the upper part of the shell when assembling and acting to centralize the sack 16 and its contents, maintaining them positively concentric. It will be understood however, that the adjuster need not be in the shape of a full and complete annulus, a series of arms intervenously entered accomplishing the same purpose.

The upper portion of the adjuster 19 may be knurled as at 19' for convenience in handling or provided with a handle, such as the strap 20 or a rigid handle so that it can be easily withdrawn from the shell.

An opening 21 may be made in the top of the adjuster into which the carbon may extend, the usual method of assemblying being to invert the adjuster, enter the sack and its carbon mass therein and then insert the same within the shell of the cell, pressing the sack into close contact with the paraffin.

These cells, when assembled with the carbon elements and containing the adjusters are placed on the surface of a travelling belt conveyor, indicated by the numeral 20, and moved over a source of heat, as the gas flame 21, thus having imparted to their bottom heat sufficient to soften the paraffin 14, into which the sack and its contents sink, to such extent as to hold the parts concentric and completely insulate the carbon from the zinc.

When the paraffin has become cool and set, the excitant, in a semi-fluid condition, is filled into the annular space, remaining after removal of the adjuster and the wax cap applied in the usual manner.

From the foregoing it will be seen that a simple device for this purpose has been disclosed in the preferred form of its embodiment, but it is not desired to restrict the details to the exact construction shown, it being obvious that changes, not involving the exercise of invention, may be made without conflicting with the scope of the appended claims.

Having thus described my invention, what I claim as new and desire to secure by Letters Patent, is:—

1. The process of assembling electric battery cells consisting of placing paraffin in the bottom of the zinc shell, entering the carbon element to rest on the paraffin, inserting a hollow cylindrical adjuster between said carbon element and the wall of said shell, applying sufficient heat to the lower portion of said shell to soften the paraffin, permitting the cell to cool, removing the adjuster, filling the space between the carbon and shell with an excitant, and sealing the end of the cell.

2. The process of assembling electric battery cells which consists in supplying a paraffin lining in the bottom of the zinc shell, enveloping the carbon within an open meshed container, entering the bobbin to rest upon the paraffin, inserting an annular adjuster interjacent said container and shell whereby concentricity is secured, softening the paraffin to permit the carbon container to become seated therein, allowing the cell to become cool, removing the adjuster, supplying an excitant in the annular space between the container and shell, and sealing the shell above the container and excitant.

3. The process of assembling electric battery cells which consists in supplying a paraffin lining in the bottom of the zinc shell, enveloping the carbon within an open meshed container, entering the container in the cell to rest upon the paraffin, inserting an annular adjuster interjacent said container and shell whereby concentricity is secured, depositing the shell on a travelling conveyor moving over a source of heat whereby the paraffin becomes softened receptive of said container to be held in position whereby, removing the adjuster, filling the remaining space in said shell with an excitant, and finally sealing the cell.

This specification signed and witnessed this second day of April, 1924.

RICHARD MAX EATON.

Witnesses:
  MAXWELL T. EATON,
  R. G. NORRIE.